Aug. 16, 1932.   J. J. JAKOSKY   1,872,297
APPARATUS FOR PRODUCING CARBON BLACK
Filed April 29, 1929
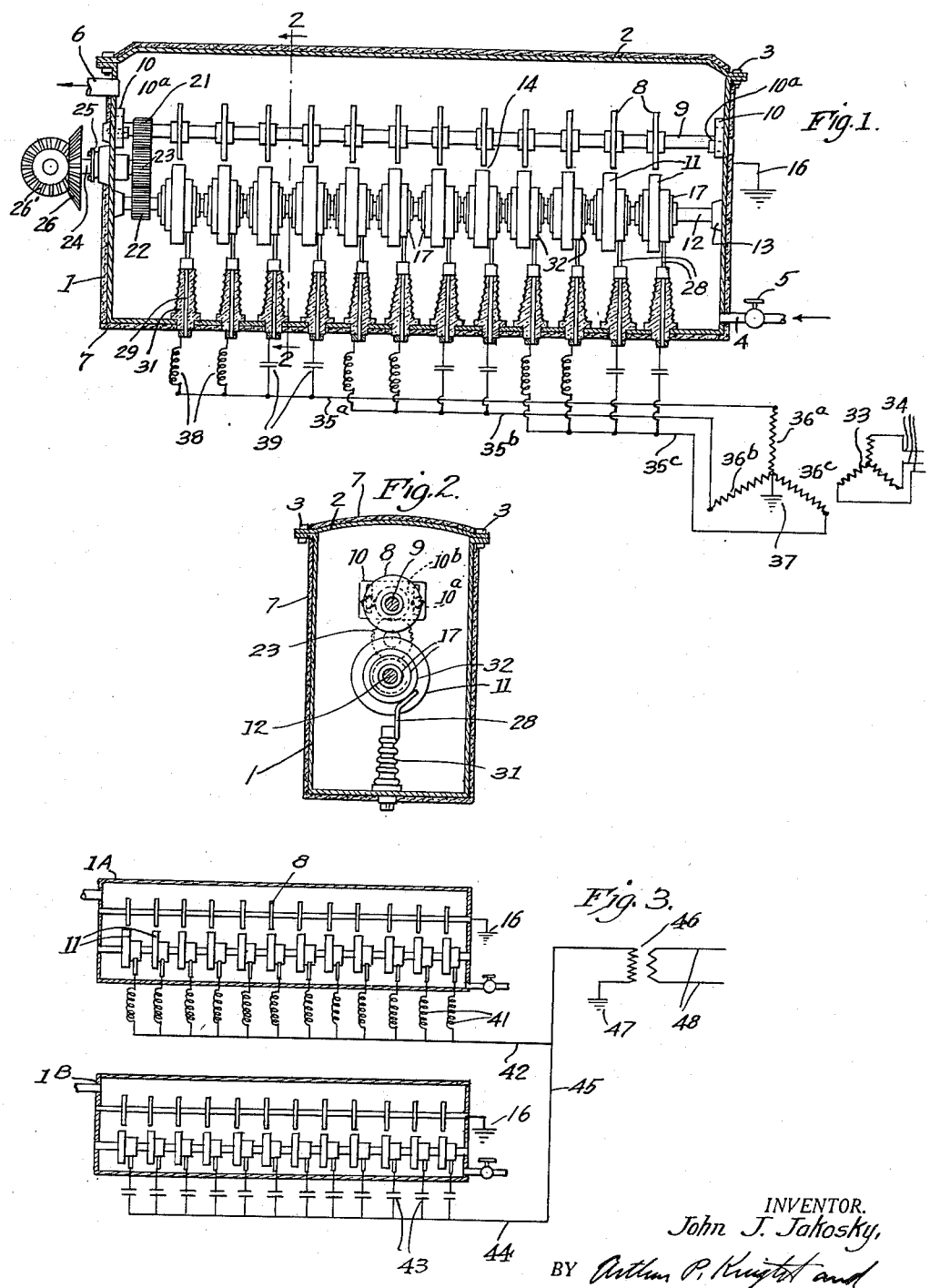
INVENTOR.
John J. Jakosky,
BY *Arthur P. Knight and Alfred W. Knight*
ATTORNEYS Patented Aug. 16, 1932

1,872,297

UNITED STATES PATENT OFFICE

JOHN J. JAKOSKY, OF LOS ANGELES, CALIFORNIA, ASSIGNOR TO ELECTROBLACKS, INC., OF CULVER CITY, CALIFORNIA, A CORPORATION OF NEVADA

APPARATUS FOR PRODUCING CARBON BLACK

Application filed April 29, 1929, Serial No. 358,948, and in Canada May 12, 1928.

This invention relates to the production of carbon black and particularly to the production thereof by dissociation of a suitable liquid hydrocarbon or other carbon bearing oil by means of an electric arc. The principal object of this invention is to provide novel and advantageous apparatus for use in the manufacture of carbon black by such methods, by means of which such manufacture may be carried out more expeditously and economically than by means of the apparatus heretofore in use.

A particular object of the invention is to provide an apparatus having a high capacity for production of carbon black in a unit of given size.

A further object of the invention is to provide an apparatus having a high efficiency of utilization of electric power.

Further objects of the invention are to provide for the maintaining of separate arcs at a plurality of arc gaps within the same body of oil and to electrically connect the electrode means defining the several arc gaps to electric power supply means in such manner as to provide maximum current or power flow through the individual arcs and consequent maximum production of carbon black, for a given KVA input.

This invention is directed, in general, to the production of carbon black by the methods described in my United States Patents 1,597,277 issued August 24, 1926 and 1,673,245 issued June 12, 1928, and to improvements in the apparatus described in said patents. The method of producing carbon black, as described in said patents, comprises essentially maintaining a localized high temperature zone, as by means of an electric arc, beneath the surface of a body of carbon bearing oil, while maintaining the temperature of the main body of oil at a relatively low temperature, so as to cause rapid and practically instantaneous dissociation of a portion of such oil into carbon in the form of carbon black and hydrogen or other gas, followed by substantially immediate withdrawal or dissemination of the products of dissociation from the electric arc or high temperature zone into the body of relatively low temperature oil surrounding the same, which quickly cools the carbon to a temperature sufficiently low to prevent further changes in the properties thereof and causes it to remain substantially in the finely divided and unagglomerated condition in which it is first formed. The carbon black produced in this manner is extremely finely divided and is suitable for use in many ways in which its fine state of subdivision are advantageous. Such carbon black also has a high tinting strength and is otherwise well suited for use in the manufacture of printing ink. The apparatus of the present invention may be used to effect dissociation of carbon bearing oil to form carbon black, either in the manufacture of carbon black as such, as described in my Patent No. 1,597,277 above mentioned, or in the direct manufacture of printing ink or material suitable for use in forming printing ink, consisting of a suspension or mixture of the carbon black resulting from such dissociation, together with undissociated portions of the carbon bearing oil as described particularly in my other Patent No. 1,673,245.

The apparatus of the present invention comprises, in general, a reaction or dissociation chamber provided with electrode means defining a plurality of arc gaps beneath the surface of the body of oil in said chamber, and separate power supply connections to the respective electrode means, whereby arcs may be maintained at all of said gaps. The apparatus of the present invention may comprise a reaction chamber, opposing electrode means mounted within said chamber and movable with respect to one another and defining one or more arc gaps between the opposing elements of said electrode means, means for maintaining a body of oil in said chamber above the level of such arc gap or gaps, means for causing relative movement of said electrode means in such manner that the opposing faces of said electrode means are caused to move in opposite relative directions at a point adjacent said gap or gaps, together with suitable electric power supply means connected to the respective electrodes.

The accompanying drawing illustrates apparatus embodying this invention, and referring thereto:

Fig. 1 is a longitudinal vertical section of a reaction chamber provided with a plurality of electrode members beneath the surface of the body of oil therein, showing one means of connecting said electrode members to electric power supply means.

Fig. 2 is a transverse section on line 2—2 in Fig. 1.

Fig. 3 is a wiring diagram for two reaction chambers, showing a modified means of supplying the electric power to the several electrode means thereof.

The apparatus shown in Figs. 1 and 2 comprises a reaction vessel or chamber 1 provided with a cover 2 secured thereto in any suitable manner as, for example, by means of bolts 3 so as to make a fluid tight fit between the vessel and the cover. A pipe 4 provided with valve 5 leads into the lower portion of chamber 1 for supplying carbon bearing oil thereto, and a pipe 6 leads from the upper portion of said chamber for conducting away gaseous products of dissociation, either with or without undissociated carbon bearing oil. The inlet and outlet pipes 4 and 6 are preferably connected at opposite ends of the chamber 1, as shown. Chamber 1 and cover 2 may be provided with a covering of heat insulating material indicated at 7.

The electrode means comprise a series of disc shaped electrode elements 8 mounted in spaced arrangement upon a substantially horizontal shaft 9 rotatably mounted in vertically adjustable bearing means 10 on the end walls of the chamber, and a corresponding series of disc shaped electrode elements 11 mounted in similarly spaced arrangement upon a shaft 12 parallel to shaft 9 and rotatably mounted in bearing means 13 on the end walls. Vertical adjustment of bearing means 10, for the purpose of adjusting the length of arc gap between opposing electrode elements may be provided by means of bolts 10a passing through vertical slots 10b in said bearing means. The electrode elements of the two series are mounted in alignment with one another, as shown, so as to provide an arc gap between each pair of opposing electrode elements, and all of the arc gaps so defined are positioned substantially at a common level in the chamber, and are hence all submerged to substantially the same depth below the surface of the body of oil in the chamber when the apparatus is in operation. The electrode elements of one series are electrically connected together and to the ground while the electrode elements of the other series are electrically insulated from one another and from the ground and are connected to a source of current. For example, the electrode elements 8 are shown as mounted directly upon the shaft 9 and electrically connected thereto, and may be grounded in any suitable manner, as, for example, through the walls of the chamber as shown at 16, while the electrode elements 11 are shown as insulated from shaft 12 and hence from one another by means by insulating bushings 17. The electrode elements 8 and 11 are formed of carbon or other suitable material in the usual manner of arcing electrodes. Shafts 9 and 12 may be rotated in any suitable manner. For this purpose said shafts may be provided with gears or pinions 21 and 22 meshing with a driving gear 23 mounted on shaft 24 extending through a stuffing box 25 at one end of the chamber, providing for rotation of the shafts in the same rotative direction, obtaining an opposite direction of travel of the opposing portions of the peripheries of the electrode elements at a line joining the centers of rotation thereof. The shaft 24 may be driven in any suitable manner at the desired speed, for example, through gear means 26 and 26'.

The electrical connection to the respective electrode elements 11 is made by means of brushes 28 connected to binding posts 29 extending through insulating bushings 31, said brushes engaging contact rings 32 secured between the respective electrode elements 11 and insulating bushings 17. The outer ends of the respective binding posts 29 may be connected to any suitable source of electric current at sufficient voltage to maintain arcs between the electrode members. In some cases, it may be desirable to use a polyphase transformer or supply circuit as a source of electric power, and to connect the respective electrodes, or groups of electrodes, to the several phases thereof. For example, the power supply means is shown in this case as comprising a Y-wound three phase transformer whose primary windings 33 may be connected to three phase power supply lines 34. In this particular case I have shown twelve electrode elements in each series, and said elements may be arranged in three groups, each comprising four pairs of electrode elements. The binding posts 29 corresponding to the electrode elements 11 of one group may be connected through wire 35a to one of the secondary windings 36a of said transformer, while the binding posts 29 for the electrode elements 11 of the other two groups may be connected by wires 35b and 35c to the secondary windings 36b and 36c respectively. The common or neutral point of said secondary windings may be grounded as indicated at 37. The secondary voltage of said transformer may be any voltage suitable for the purpose in the dissociation of oil to form carbon black according to the method outlined above; for example, it may be from 500 to 25000 volts or more. A reactive impedance means is included in the connection from the transformer windings to each of the electrode elements, and such impedance means are shown as comprising inductances 38 in the connections leading to two of the electrode elements 11 of each group and capacity means 39 included in the connections to the other two electrode elements of each group.

The dissociation of the oil and production of carbon black is carried out in the above described apparatus as follows:

The oil to be treated enters the reaction chamber 1 through pipe 4 and a body of such oil is maintained within said chamber up to a level above the zone of arcing between the opposing electrode elements. The valve 5 may be so adjusted as to cause the oil to enter at the desired rate, and the products may be continually withdrawn through outlet pipe 6. The electrode elements 8 and 11 are set in rotation at a suitable speed and the desired electric potential is maintained between said electrode elements so as to cause a series of arcs to form between the opposing edges thereof. It is thus seen that a plurality of comparatively restricted high temperature dissociation zones are provided surrounded by a relatively large body of oil at a materially lower temperature than the temperature of such dissociation zones. The electrode elements 8 and 11 are adjusted by vertical adjustment of bearing means 10, so as to give the desired length of arc gap, and such adjustment may be repeated whenever necessary, due to gradual wearing away or consumption of the surfaces of the electrode elements. The teeth of gears 21 and 23 may be made deep enough to permit such vertical adjustment. It will be observed that adjustment of bearing means 10 simultaneously adjusts the length of the arc gaps between all of the opposing electrode elements. It will also be seen that, regardless of the position of vertical adjustment of shaft 9, said shaft extends substantially horizontally, and the arc gaps between the respective electrode elements are thus all submerged to substantially uniform depth beneath the surface of the oil at all times.

The high temperature in the dissociation zones causes the oil in and immediately surrounding each of said zones to be dissociated principally into carbon and hydrogen (together with small amounts of methane and light unsaturated gases). Due to the rotation of the electrode elements a fresh supply of oil is continually drawn into the dissociation zones along that portion of the electrode surface which moves toward such a zone and the products of dissociation are disseminated by being drawn away from said zones along that portion of the electrode surfaces moving away from said zones, substantially immediately upon their formation, into the surrounding body of relatively low temperature oil. This movement of fresh oil toward the dissociation zones and of the reaction products out of the dissociation zones is also assisted in part by the convection currents produced in the body of oil due to heating the oil around the dissociation zones, and also by the agitation of the oil due to the escape of hydrogen and other gases upwardly therethrough from said dissociation zones.

The temperature in the dissociation zones is relatively high, for example from about 2000° to 3000° F., while the temperature of the oil immediately surrounding such zones is much lower than this, as substantially the same temperature prevails throughout the entire body of oil outside the dissociation zones due to the continual agitation and circulation of such oil. A steep temperature gradient is thus provided between the oil and the arcs, and the actual dissociation, therefore, takes place only in the arcs or at the surface of the oil around the arcs or throughout a very thin layer immediately surrounding the same.

The hydrogen and other gases produced by the resulting dissociation of oil at the surface of the arc pass upwardly through the body of oil to the top of the chamber and hence out through pipe 6. It is evident that the maintenance of equal submergence of all of the arcs causes equal pressures to prevail therein, so that any effect of inequalities of pressure, tending to cause differences in rate of dissociation or in the quality of carbon black produced, is elimniated, and an optimum uniform pressure may be maintained in all of the arcs. The carbon black formed at the surface of the dissociation zones is immediately disseminated into the relatively low temperature oil surrounding the same and is retained in suspension in such oil. The carbon black so formed will accumulate to a certain extent in the oil within the reaction chamber, but the presence of such carbon black in the oil does not hinder in any way the dissociation of further quantities of the oil to form additional carbon black. I prefer to supply the oil at such a rate that a continual overflow of undissociated oil, with carbon black in suspension therein, passes out through outlet pipe 6 along with the gases or vapors. Such oil may be separated in any desired manner from the gaseous products, as by means of a separating trap. The resulting suspension of carbon black in oil may be used either for the production of printing ink as described in my above mentioned Patent No. 1,673,245, or the carbon black may be separated from the oil, as by settling, centrifuging or filtering, for the formation of substantially dry carbon black, as described in my Patent No. 1,597,277.

An advantage of the above apparatus is that it provides a plurality of arcs at an equal depth beneath the surface of a body of oil and also provides for proper contact of oil with the arcs. A maximum arc contact, and hence a maximum dissociating capacity, with removal of products of dissociation from the arcs, is thus provided in a single reaction chamber.

In series with each arc is a reactance, in order to limit the flow of current in the circuit. This reactance is necessary due to the arc having a negative characteristic, i. e., its resistance decreases with increase in the current. A high voltage is necessary in order to initially break down the oil and the reactance is, therefore, required to prevent the excessive flow of current after the initial breaking down of the oil between the two electrodes.

The reactance used in series with the several arcs should be such as to give the desired resultant power factor for a group of arcs connected to a single power supply or transformer. This is necessary in order to obtain the maximum power output consistent with the minimum KVA rating of the equipment. In this case it will be seen that the impedance in series with each arc consists either of an inductance or a capacity so as to give a low power factor, and consequent low consumption of power by said impedance means, but that there are four arcs connected to each transformer phase and that the use of inductance in series with two of said arcs and capacities in series with the other two arcs will give a resultant power factor approaching unity for each transformer phase.

In Fig. 3 I have shown a modified arrangement of the electric circuits for supplying electric power to the arcs. In this case the series of electrode elements 8 and 11 are shown diagrammatically for two reaction chambers 1A and 1B. Said electrode elements 8 and 11 are mounted in the same manner as, and are adapted to rotate in the same directions as in the form of apparatus shown in Figs. 1 and 2. The electrode elements 8 of both chambers are grounded as before, as indicated at 16. The electrode elements 11 of chamber 1A are separately connected through inductance means 41 to a wire 42, while the electrode elements 11 of chamber 1B are separately connected through capacity means 43 to wire 44, said wires 42 and 44 being both connected by wire 45 to a common source of electric power, such as the secondary winding of transformer 46, the other side of said secondary winding being grounded as indicated at 47. The primary winding of said transformer may be connected to a single phase supply circuit indicated at 48. It will be understood, of course, that the high tension wire 45, instead of being connected to the supply circuit through a transformer as shown, may be connected directly to a single phase high voltage power supply circuit.

The operation of the apparatus is in this case essentially the same as above described. The use of the same type of reactance means in series with all of the electrodes of each chamber insures that all of the electrodes in each chamber will wear away at substantially the same rate, so that all of the arc gaps in each chamber may easily be maintained equal in length. With such an arrangement it is highly desirable to connect the electrodes for two reaction chambers to a common source of electric power, whereby the capacity means in the branch circuits for the arc gaps of one reaction chamber and the inductance means in the branch circuits for the arc gaps of the other reaction chamber combine to produce a resultant power factor of the desired value, for example a power factor approaching unity.

I claim:

1. An apparatus for producing carbon black from carbon bearing oils comprising a reaction chamber, opposing electrode means mounted within said chamber and defining an arc gap, means for maintaining a body of oil in said chamber above the level of said gap, means for causing relative movement of said electrode means in such manner that the opposing faces of said electrode means are caused to move in opposite directions at a point adjacent said gap, and electric power supply means connected to the opposing electrode means.

2. An apparatus for producing carbon black from carbon bearing oil comprising a reaction chamber; opposing disc-shaped electrode means rotatably mounted within said chamber and defining an arc gap between the opposing portions of the peripheries of said discs at a line joining the centers of rotation thereof, means for maintaining a body of oil in said chamber above the level of said gap, means for causing rotation of said disc-shaped electrode means in such manner that the opposing portions of the peripheries at the line joining the centers thereof are caused to move in opposite directions, and electric power supply means connected to the opposing electrode means.

3. An apparatus for producing carbon black from carbon bearing oil comprising a reaction chamber, two rotatably mounted shafts extending horizontally within said chamber, one or more spaced electrode elements mounted on each of said shafts, each electrode element on each of said shafts being aligned with and spaced from a corresponding electrode element on the other of said shafts so as to define an arc gap between opposing portions of the peripheries thereof at the line joining the centers of said shafts. means for maintaining a body of oil within said chamber above the level of each arc gap thus defined, means for rotating said shafts in the same rotative direction so as to cause the opposing portions of the peripheries of said elements to move in opposite directions at the line joining the centers of rotation thereof, and means for maintaining an electrical potential between opposing electrode elements sufficient to cause arcing therebetween.

In testimony whereof I have hereunto subscribed my name this 20th day of April, 1929.

JOHN J. JAKOSKY.